Oct. 27, 1964 E. ZAHAVI 3,154,703

MAGNETOHYDRODYNAMIC GENERATORS OF ALTERNATING CURRENT

Filed April 11, 1960 2 Sheets-Sheet 1

INVENTOR:
Elias Zahavi

Oct. 27, 1964     E. ZAHAVI     3,154,703
MAGNETOHYDRODYNAMIC GENERATORS OF ALTERNATING CURRENT
Filed April 11, 1960     2 Sheets-Sheet 2

INVENTOR:
Elias Zahavi

United States Patent Office 3,154,703
Patented Oct. 27, 1964

3,154,703
MAGNETOHYDRODYNAMIC GENERATORS OF
ALTERNATING CURRENT
Elias Zahavi, Brooklyn, N.Y.
(715 Ringwood Ave., Pompton Lakes, N.J.)
Filed Apr. 11, 1960, Ser. No. 21,391
7 Claims. (Cl. 310—11)

This invention relates to generators of alternating current, or A.C., in which a current is induced in a conductor moving in a magnetic field.

Heretofore, in the above generators, in order to induce A.C., a winding was revolved in a magnetic field. To revolve the winding a prime mover was required. Either a turbine or a combustion engine was used for the prime mover.

The present invention provides a generator without the need for a prime mover for conductor moving. It eliminates the use of combustion engines, turbines, and expensive steam boilers for turbines. It dispenses with the said parts, reducing thus the space used by a generator and the investment needed to construct one. This results in a considerably reduced cost of A.C.

The substance of the present invention is, in an intermittent firing combustion chamber, to produce an alternating magnetic field and to exhaust the hot products of combustion across the said magnetic field. The inducement of A.C. in the burned gases during their exhaust movement, as they cross the magnetic field, is the object of this invention.

Figure 1:
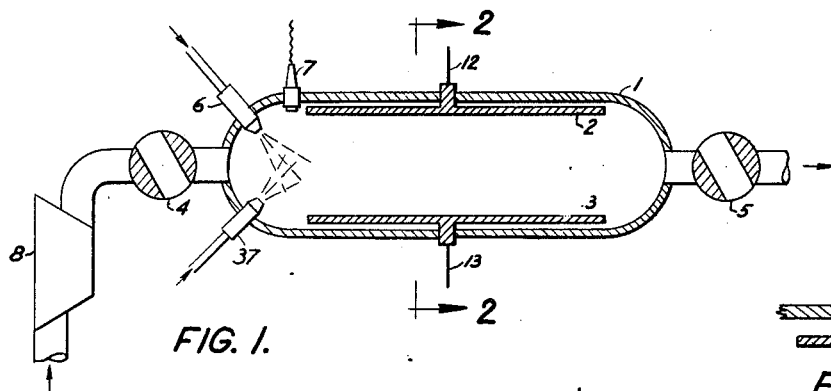
Figure 6:
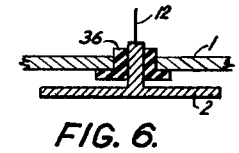
Figure 2:
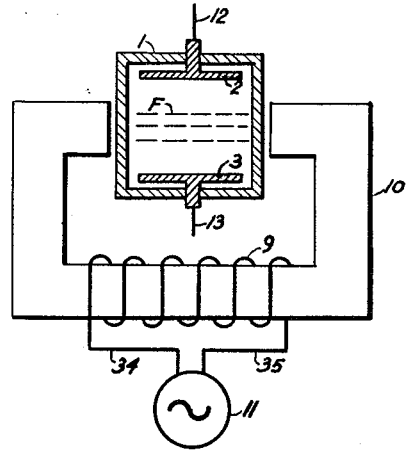
Figure 3:
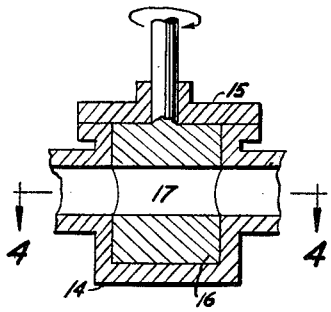
Figure 4:
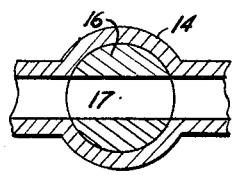
Figure 5:
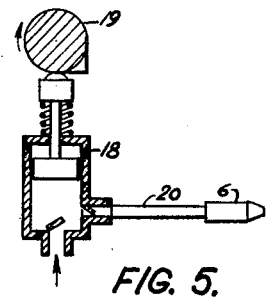
Figure 7:
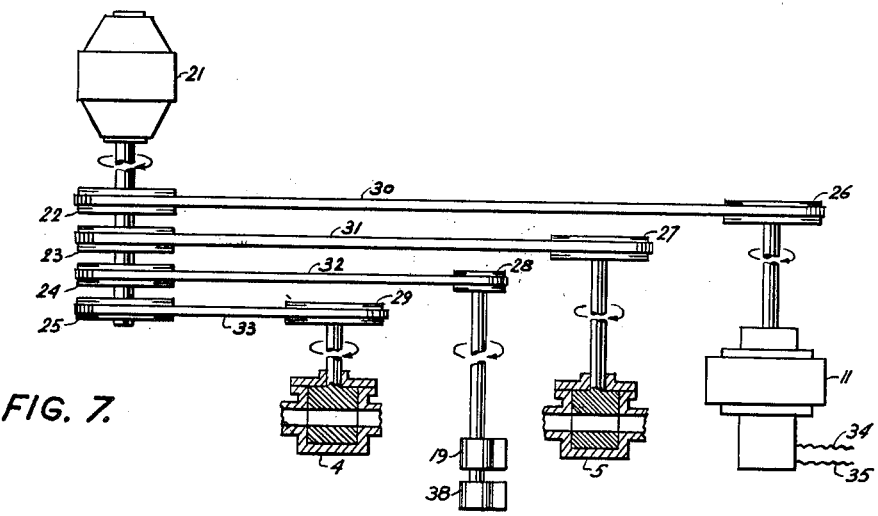
Figure 8:
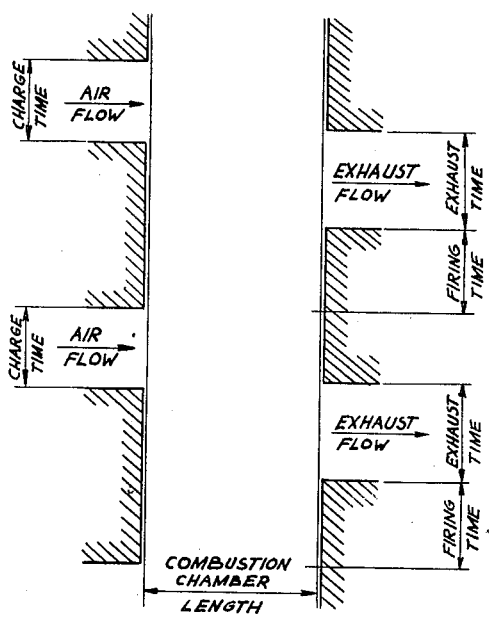
Figure 9:
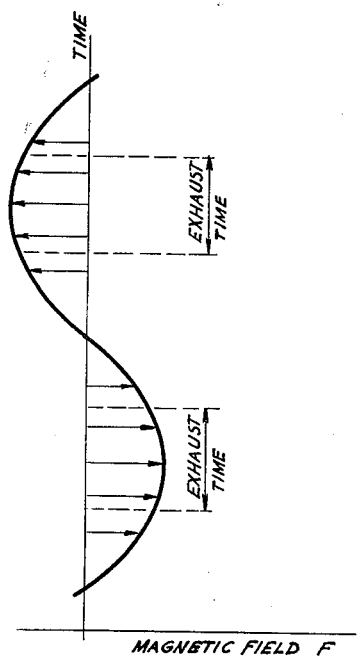

The invention is explained by means of accompanying drawings in which:

FIG. 1 shows an A.C. generator of present invention.
FIG. 2 shows a cross section of the generator.
FIG. 3 shows a valve of the generator.
FIG. 4 shows a cross section of the valve on line 4—4 of FIG. 3.
FIG. 5 shows a fuel system.
FIG. 6 shows an insulation detail of the electrode.
FIG. 7 shows control means of the generator.
FIG. 8 shows the operation of the generator.
FIG. 9 shows a cycle of the magnetic field of the generator.

FIG. 1 shows an A.C. generator of present invention, while FIG. 2 shows a cross section through the middle thereof. The generator comprises a combustion chamber 1, made for instance of ceramics; two electrodes 2 and 3 inside the combustion chamber; an air supply valve 4; an exhaust valve 5; a fuel injector 6; an igniter 7; a potassium injector 37; an air compressor 8; a field winding 9 located on an iron core 10; and a generator of A.C. 11, for the said field winding. 12 and 13 are power lines. The electrodes 2 and 3 are of flat metal and are electrically insulated from each other. They are arranged at two opposite side-walls of the chamber 1 so as to face each other. The supply valve 4 is adjacent to one end of the chamber 1, and the exhaust valve 5 is adjacent to the other end. When the exhaust valve is opened, the direction of exhaust is parallel to the electrodes 2 and 3. The field winding 9 and the iron core 10 are outside the combustion chamber. They are so arranged as to produce a magnetic field F, running along the electrodes 2 and 3, across the direction of exhaust.

The generator 11 is of a conventionally used kind. It is assumed, for example, a bipolar dynamo to be the generator 11.

The dynamo 11 supplies an A.C. to the winding 9. The winding 9 produces the magnetic field F. This magnetic field F is alternating, since the said current alternates. The frequency of the alternating magnetic field F is equal to the frequency of the A.C. supplied by the dynamo 11.

The valves 4 and 5 are adapted to close periodically. FIG. 3, for example, shows a valve to perform that function. FIG. 4 shows a cross section of the valve. The rotor 16, having an opening 17 perpendicular to the rotor's axis, rotates with constant speed in the cylinder 14 whereby the valve closes and opens periodically. 15 is the cylinder cover.

FIG. 5 shows a fuel system of the generator of present invention. 6 indicates the fuel injector. 18 represents the pump. 19 indicates pump impelling means, as for instance a cam. As the cam rotates with constant speed, it operates periodically the pump 18 and therefore the injector 6.

FIG. 7 shows control means of the magnetohydrodynamic generator of present invention. 21 is the driving motor. 22, 23, 24, 25, 26, 27, 28, and 29 are sheaves. 30, 31, 32, and 33 are belts. Through the shown system of sheaves and belts, the motor 21 drives the rotary valves 4 and 5, the cam 19, and the bipolar dynamo 11. As the motor 21 rotates at constant speed, the valves 4 and 5 close and open periodically, the cam 19 operates periodically the pump 18, and the dynamo 11 produces A.C. The sheaves 22, 23, 24, 25, 26, 27, and 29 are assumed to be of equal diameter. The sheave 28 is assumed to be of half diameter of the other sheaves. Thus, per each rotation of the motor 21 the valves 4 and 5 close and open twice, the cam 19 operates the pump 18 twice, and the dynamo 11 makes one cycle. Of course, the closing points of the valves 4 and 5, the operation of the pump 18 by the cam 19, and the A.C. of the dynamo 11 may be shifted with respect to each other to obtain an arrangement as described in the following description of the operation of the generator.

Materials and details of construction of the magnetohydrodynamic generator are those conventionally used in parts of the nature shown.

The magnetohydrodynamic generator operates in the following manner. FIG. 8 shows schematically the operation. First the valve 5 is closed and the valve 4 is opened for admission of an air charge into the chamber 1. Next the valve 4 closes and fuel is injected, then ignited, and explosion occurs. Then the valve 5 opens for exhaust of burned gases, whereby the first cycle is accomplished. As the second cycle starts, the valve 4 opens for admission of an air charge and the valve 5 closes. Next the valve 4 closes for fuel injection and explosion. Then the valve 5 opens for exhaust of burned gases, whereby the second cycle is accomplished. The succeeding cycles follow in the same manner. The valves 4 and 5 close at a frequency twice the frequency of the alternating magnetic field F. FIG. 9 shows a cycle of the alternating magnetic field F. As shown in the figure, the exhaust of burned gases coincides with a maximum of the magnetic field F. Thereby the exhaust of each odd cycle coincides with one direction of the magnetic field, and the exhaust of each even cycle coincides with the opposite direction of the magnetic field. Thereby an alternating electric pressure is imposed upon the cables 12 and 13 and power is obtained.

The generator operates upon a principle of magnetohydrodynamics whereby electrical current is induced in an ionized gas as it crosses a magnetic field. Based on this principle, A.C. is induced in the burned gases in chamber 1 which are ionized due to their high temperature, as they cross the alternating magnetic field F and exhaust through the valve 5.

The efficiency of the generator depends upon the degree of ionization of the exhaust gases. To increase the ionization an aqueous solution of ordinary salt, such as for instance potassium carbonate, is injected by the injector 37 into chamber 1 before each firing. The potassium carbonate solution is supplied by a pump similar to the pump 18 of FIG. 5. The potassium carbonate solution pump is driven by the cam 38 of FIG. 7. As shown in the figure, the cam 38 is located on the same camshaft as the cam 19. Both cams are in the same circular position on the camshaft, so that the injection of potassium carbonate and of fuel occur at the same time.

A modified design of the magnetohydrodynamic generator can be achieved with the combustion chamber 1 made of metal. Here, to insulate the electrodes from each other, electrical insulators are required. FIG. 6 shows an insulation detail. The electrode is mounted in the combustion chamber 1 by means of the insulator 36.

A modified form of the magnetohydrodynamic generator may be built with no compressor for air supply. When the magnetic field is weak enough, the exhaust of burned gases from the combustion chamber is rapid. This will impose a vacuum in the combustion chamber after exhaust. Then, when subsequently the air supply valve 4 opens, air may enter the combustion chamber without help of a compressor.

The industry requires an A.C. of the frequency of either 3,000 or 3,600 cycles per minute. Therefore the most useful magnetohydrodynamic generator will operate at a firing frequency of either 6,000 or 7,200 per minute.

It is to be understood that the terms of the invention herewith shown and described are to be taken as preferred examples of the same and that various changes and modifications can be made therein without departing from the spirit and the scope of the invention as defined in the subjoined claims.

I claim:

1. An A.C. generator comprising an intermittent firing combustion chamber, two electrodes electrically insulated from each other at two opposite walls inside the said chamber, parallel to the direction of exhaust, arranged to face each other, a field winding outside the said chamber for producing an alternating magnetic field running along the said electrodes, across the direction of exhaust, and a generator of A.C. for the said winding; the said chamber being so adapted in respect to the said alternating magnetic field that the said chamber fires at a frequency twice the frequency of the said alternating magnetic field, and that the said exhaust of burned gases occurs at a time when the said field is at maximum.

2. An A.C. generator, comprising an intermittent firing combustion chamber, two electrodes electrically insulated from each other at two opposite walls inside the said chamber, parallel to the direction of exhaust, arranged to face each other, a compressor arranged to supply an air charge into the said chamber before each firing, a field winding outside the said chamber for producing an alternating magnetic field running along the said electrodes, across the direction of exhaust, and a generator of A.C. for the said field winding; the said chamber being so adapted in respect to the said alternating magnetic field, that the said chamber fires at a frequency twice the frequency of the said alternating magnetic field, and that the said exhaust of burned gases occurs at a time when the said field is at maximum.

3. An A.C. generator comprising a combustion chamber, two electrodes electrically insulated from each other at two opposite side-walls inside the said chamber, arranged to face each other, an air supply valve—adapted to close periodically—adjacent to one end of the said chamber, an exhaust valve—adapted to close periodically—adjacent to the other end of the said chamber, fuel injection means in the said chamber, control means for operating periodically the said fuel injection means, ignition means in the said chamber, a compressor for supplying air through the said supply valve into the said chamber, a field winding outside the said chamber for producing an alternating magnetic field running along the said electrodes, across the direction of exhaust, and a generator of A.C. for the said field winding; the said valves and the said control means being so adapted in respect to each other that, in turn, the said exhaust valve is closed and the said supply valve is open for admission of an air charge into the said chamber, then the said valves are closed for fuel injection and explosion, and then the said supply valve is closed and the said exhaust valve is open for exhaust of burned gases; the said valves and the said control means being further so adapted in respect to the said alternating magnetic field, that the said valves close and the said control means operate the said injection means at a frequency twice the frequency of the said alternating magnetic field, and that the said exhaust of burned gases occurs at a time when the said field is at maximum.

4. An A.C. generator comprising a combustion chamber, two electrodes electrically insulated from each other at two opposite side-walls inside the said chamber, arranged to face each other, an air supply rotary valve of constant speed adjacent to one end of the said chamber, an exhaust rotary valve of the same constant speed adjacent to the other end of the said chamber, fuel injection means in the said chamber, control means for operating periodically the said fuel injection means, ignition means in the said chamber, a compressor for supplying air through the said supply valve into the said chamber, a field winding outside the said chamber for producing an alternating magnetic field running along the said electrodes, across the direction of exhaust, and a generator of A.C. for the said field winding; the said valves and the said control means being so adapted in respect to each other that, in turn, the said exhaust valve is closed and the said supply valve is open for admission of an air charge into the said chamber, then the said valves are closed for fuel injection and explosion, and then the said supply valve is closed and the said exhaust valve is open for exhaust of burned gases; the said valves and the said control means being further so adapted in respect to the said alternating magnetic field that the said valves close and the said control means operate the said injection means at a frequency twice the frequency of the said alternating magnetic field, and that the said exhaust of burned gases occurs at a time when the said field is at maximum.

5. An A.C. generator as defined in claim 4 having means to inject an aqueous solution of salt into the combustion chamber before each firing.

6. An A.C. generator as defined in claim 4 wherein the said valves close and the said control means operate the said injection means at a frequency of 6,000 cycles per minute.

7. An A.C. generator as defined in claim 4 wherein the said valves close and the said control means operate the said injection means at a frequency of 7,200 cycles per minute.

References Cited by the Examiner

UNITED STATES PATENTS

| | | |
|---|---|---|
| 1,509,103 | 9/24 | Elliott. |
| 1,717,413 | 6/29 | Rudenberg. |
| 1,916,076 | 6/33 | Rupp. |
| 2,722,122 | 11/55 | Soffel. |

MILTON O. HIRSHFIELD, *Primary Examiner.*

ORIS L. RADER, DAVID X. SLINEY, *Examiners.*